US009857192B2

(12) United States Patent
Slusar et al.

(10) Patent No.: US 9,857,192 B2
(45) Date of Patent: *Jan. 2, 2018

(54) PREDICTIVE NATURAL GUIDANCE

(71) Applicant: HERE Global B.V., Veldhoven (NL)

(72) Inventors: Mark Slusar, Chicago, IL (US); Ken Prchal, Seattle, WA (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,922

(22) Filed: May 13, 2015

(65) Prior Publication Data

US 2015/0241236 A1 Aug. 27, 2015

Related U.S. Application Data

(63) Continuation of application No. 13/537,884, filed on Jun. 29, 2012, now Pat. No. 9,043,140.

(51) Int. Cl.
*G01C 21/36* (2006.01)
*G01C 21/20* (2006.01)

(52) U.S. Cl.
CPC .............. *G01C 21/36* (2013.01); *G01C 21/20* (2013.01); *G01C 21/3644* (2013.01)

(58) Field of Classification Search
CPC ..... G01C 21/20; G01C 21/36; G01C 21/3644
See application file for complete search history.

(56) References Cited

U.S. PATENT DOCUMENTS

| | | | |
|---|---|---|---|
| 6,529,831 B1 * | 3/2003 | Smith | G08G 1/162 340/903 |
| 6,871,144 B1 | 3/2005 | Lee | |
| 7,650,217 B2 | 1/2010 | Ueyama | |
| 7,844,398 B2 | 11/2010 | Sato et al. | |
| 7,912,637 B2 | 3/2011 | Horvitz et al. | |
| 2004/0167706 A1 * | 8/2004 | Becker | G01S 5/0009 701/467 |
| 2007/0276596 A1 * | 11/2007 | Solomon | G01C 21/3632 701/431 |

(Continued)

FOREIGN PATENT DOCUMENTS

WO    WO2011158352    12/2011

OTHER PUBLICATIONS

Selecting a Person-Tracking Solution for Security, Retail or Interactive Entertainment, TYZX Systems that See, accessed May 31, 2012.

*Primary Examiner* — Jerrah Edwards
*Assistant Examiner* — Kelly D Williams
(74) *Attorney, Agent, or Firm* — Lempia Summerfield Katz LLC

(57) ABSTRACT

In one embodiment, a navigation system provides predictive natural guidance utilizing a mobile landmark based on location data. The location data may be a schedule. A controller receives data of a schedule of a mobile landmark. The location data could be collected in real time or estimated. The mobile landmark may be a vehicle or a celestial body. The controller correlates a route from an origin location to a destination location and the location of the mobile landmark. The controller generates a message based on the correlation. The message is output during presentation of the route and references the mobile landmark.

21 Claims, 10 Drawing Sheets

(56) References Cited

U.S. PATENT DOCUMENTS

| | | | |
|---|---|---|---|
| 2008/0262717 A1* | 10/2008 | Ettinger | G01C 21/3476 |
| | | | 701/467 |
| 2010/0023257 A1* | 1/2010 | Machino | G01C 21/34 |
| | | | 701/533 |
| 2011/0054772 A1 | 3/2011 | Rossio et al. | |
| 2011/0092249 A1 | 4/2011 | Evanitsky | |
| 2011/0112759 A1 | 5/2011 | Bast et al. | |
| 2011/0184593 A1 | 7/2011 | Swope | |
| 2011/0279222 A1 | 11/2011 | LeGree | |
| 2012/0062357 A1 | 3/2012 | Slamka | |
| 2012/0106801 A1 | 5/2012 | Jackson | |
| 2012/0194551 A1 | 8/2012 | Osterhout et al. | |
| 2012/0310530 A1 | 12/2012 | Lee | |
| 2013/0090849 A1 | 4/2013 | Uetake | |
| 2013/0173156 A1* | 7/2013 | Wither | G01C 21/3682 |
| | | | 701/533 |
| 2014/0005929 A1 | 1/2014 | Gale et al. | |

* cited by examiner

| Geographic Position | Landmark | Date and Time | Address | Relationship |
|---|---|---|---|---|
| X1, Y1 | Bus 24 | 232, 10:24 | 111 Main St. | North side |
| X1, Y2 | Bus 24 | 232, 10:27 | 113 Main St. | Turning right |
| X1, Y3 | Bus 24 | 232, 10:29 | 200 Elm St. | East side |
| X1, Y4 | Bus 24 | 232, 10:33 | 214 Elm St. | East side |
| X1, Y5 | Taxi 123 | 5:30, d | 57 Eighty-fifth St. | Turning right |
| X2, Y6 | Taxi 123 | 5:31, d | 8510 First Avenue | South side |
| X2, Y7 | Food Truck A | 233, 11:30-14:00 | Madison and Canal | Stationary |
| X3, Y8, Z1 | Acme Flight 5379 | 19:21-19:35, MWF | Madison and Canal | Sky |

PREDICTIVE NATURAL GUIDANCE

This application is a continuation under 37 C.F.R. §1.53(b) and 35 U.S.C. §120 of U.S. patent application Ser. No 13/537,884 titled "Predictive Natural Guidance" and filed Jun. 29, 2012, which in incorporated by reference in its entirety.

FIELD

The following disclosure relates to operating a navigation system, and more particularly to providing route information using predictive natural guidance along a route.

BACKGROUND

Navigation systems provide end users with various navigation-related functions and features. For example, some navigation systems are able to determine an optimum route to travel along a road network from an origin location to a destination location in a geographic region. Using input from the end user, the navigation system examines potential routes between the origin location and the destination location to determine the optimum route. The navigation system may then provide the end user with information about the optimum route in the form of guidance that identifies the maneuvers to be taken by the end user to travel from the origin to the destination location. Some navigation systems show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The represented geographic features may include one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. One area in which there is room for improvement relates to providing guidance to follow a route. The geographic data used in conventional navigation systems is static. The geographic data is stored ahead of time in the database representing physical features that do not generally change over time. The optimal landmarks or features in the geographic region to provide the navigation-related functions and features may not be included in the conventional geographic database.

SUMMARY

In one embodiment, a navigation system provides predictive natural guidance utilizing a mobile landmark based on location data. The location data may be a schedule. A controller receives data of a schedule of a mobile landmark. The location data could be collected in real time or estimated. The mobile landmark may be a vehicle or a celestial body. The controller correlates a route from an origin location to a destination location and the location of the mobile landmark. The controller generates a message based on the correlation. The message is output during presentation of the route and references the mobile landmark.

BRIEF DESCRIPTION OF THE DRAWINGS

Exemplary embodiments of the present invention are described herein with reference to the following drawings.

FIG. 6 illustrates example schedule data of the navigation system of FIG. 1.

DETAILED DESCRIPTION

The disclosed embodiments relate to presenting predictive natural guidance. The term guidance refers to a set of navigation instructions that reference map elements such as roads and distances (e.g., "turn right on Elm Street in 500 feet"). Natural guidance allows navigation systems to expand into unconventional areas, such as malls and office buildings. Natural guidance refers to other elements outside of the map elements but in the vicinity of the user (e.g., "turn right at the fountain" and "turn left past the coffee shop"). Natural guidance may be defined as a turn-by-turn experience encompassing multiple attributes and relations which details the user's environment and context, e.g. landmarks, to more natural, environmental and intuitive triggers. Guidance messages formed using natural guidance may provide details of contextual elements, such as landmarks, surrounding decision points such as points of interest, cartographic features and traffic signals and/or stop signs.

Predictive natural guidance expands the natural guidance to mobile objects. The term predictive natural guidance refers to a set of navigation instructions that references landmarks and navigational cues that are "about to happen" or to mobile objects. The landmarks and navigational cues may be derived from a schedule that is provided by and/or established by an outside entity. Examples of these landmarks include public buses, trains, airplanes, food trucks, boats, ferries, and other objects. Alternatively, the landmarks and navigational cues may be derived from a known schedule. Examples of these landmarks include the sun, stars, the moon, clouds, smoke stacks, and other objects.

Figure 1:
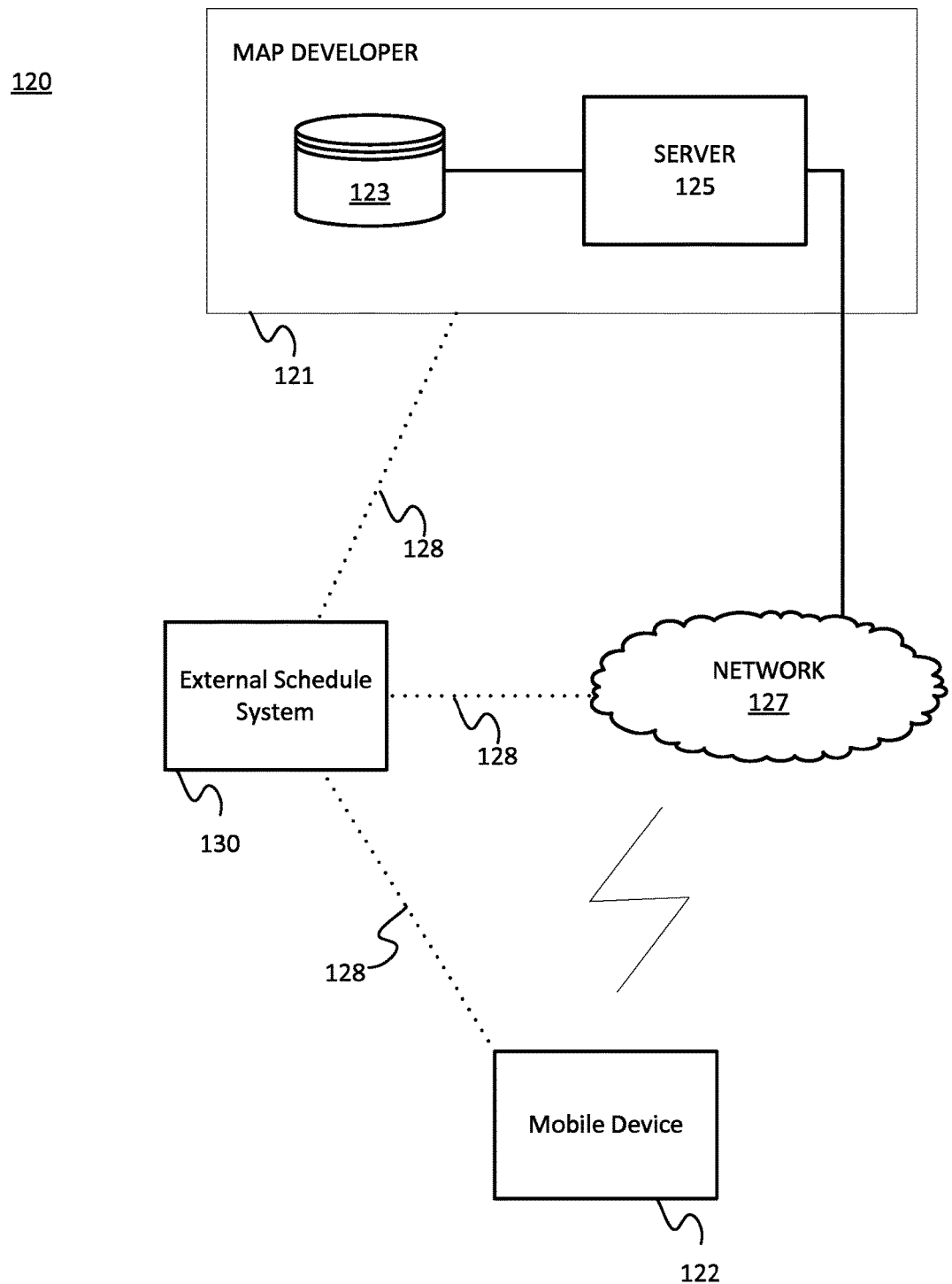
FIG. 1 illustrates an exemplary navigation system.

FIG. 1 illustrates an exemplary navigation system 120. The navigation system 120 includes a map developer system 121, a mobile device 122, an external schedule system 130 and a network 127. The developer system 121 includes a server 125 and a database 123. The external schedule system 130 may be integrated with the developer system 121. The developer system 121 may include computer systems and networks of a system operator (e.g., NAVTEQ or Nokia Corp.). The mobile device 122 is a navigation apparatus configured to present predictive natural guidance to the user. The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. Alternatively, the operation of the mobile device 122 without a purpose-based position sensor is used by the positioning system (e.g., cellular triangulation). The mobile device 122 receives location data from the positioning system.

The developer system 121, the workstation 128, and the external schedule system 130 are coupled with the network 127. The phrase "coupled with" is defined to mean directly connected to or indirectly connected through one or more intermediate components. Such intermediate components may include both hardware and software based components.

The computing resources necessary for route navigation may be divided between or may be handled independently by the server 125 and the mobile device 122. In some embodiments, the server 125 performs a majority of the processing ("server-based embodiments"). In other embodiments, the mobile device 122 performs a majority of the processing ("endpoint-based embodiments"). In addition, the processing may be divided substantially evenly between the server 125 and the mobile device 122 ("hybrid embodiments"). As an example, the following initial discussion focuses on server-based embodiments.

The server 125 is configured to location data of a schedule of a mobile landmark from the external schedule system 130. The location data or schedule may be defined or generated by a third party. The schedule may be a public transportation schedule, such as a bus schedule, a train schedule, a trolley schedule, or a ferry schedule. The schedule may be established by a municipality or detected in real time, such as monitoring the position of police cars, fire trucks, or taxicabs. The schedule may be a natural schedule, such as a celestial object schedule for stars, planets, or moons, or a weather schedule for dark clouds or other weather feature. The schedule may be a schedule for the changing appearance of an object, such as when smoke is visible from a factory or when a drawbridge is raised, when "old faithful" will be active, or when a fountain turns on or off. The schedule may include times and locations where the mobile landmark is visible, located within a range of visibility, or will operate when visible.

The server 125 is configured to determine a correlation between a route from an origin location to a destination location and the schedule of the mobile landmark. In one example, the schedule includes a list of longitude and latitude coordinate pairs. Each coordinate pair is associated with time values and direction values. When the route intersects one of the longitude and latitude coordinate pairs at a time within a range set by the associated time values, the server 125 generates an assurance message based on the correlation. The assurance message references the landmark and may reference the direction value associated with the longitude and latitude coordinate pairs. For example, the assurance message may state, "continue forward following the 156 Bus," "turn left in the direction of the airplane in the sky," or "turn right away from the sun." The terms "forward," "left," and "right" are direction values that may be retrieved based on the current position of the user and the position of the mobile object of the schedule.

The server 125 may be configured to augment a predetermined route to include the assurance message and send the route to the mobile device 122. For example, the server 125 may replace a static navigation message in the route with the assurance message. An example static navigation messages includes "turn left on Elm Street." This message may be replaced with "turn left with the 103 bus." Alternatively, the server 125 may add the assurance message to the turn-by-turn directions of the route, such as "turn left on Elm Street, following the 103 bus."

Figure 2:
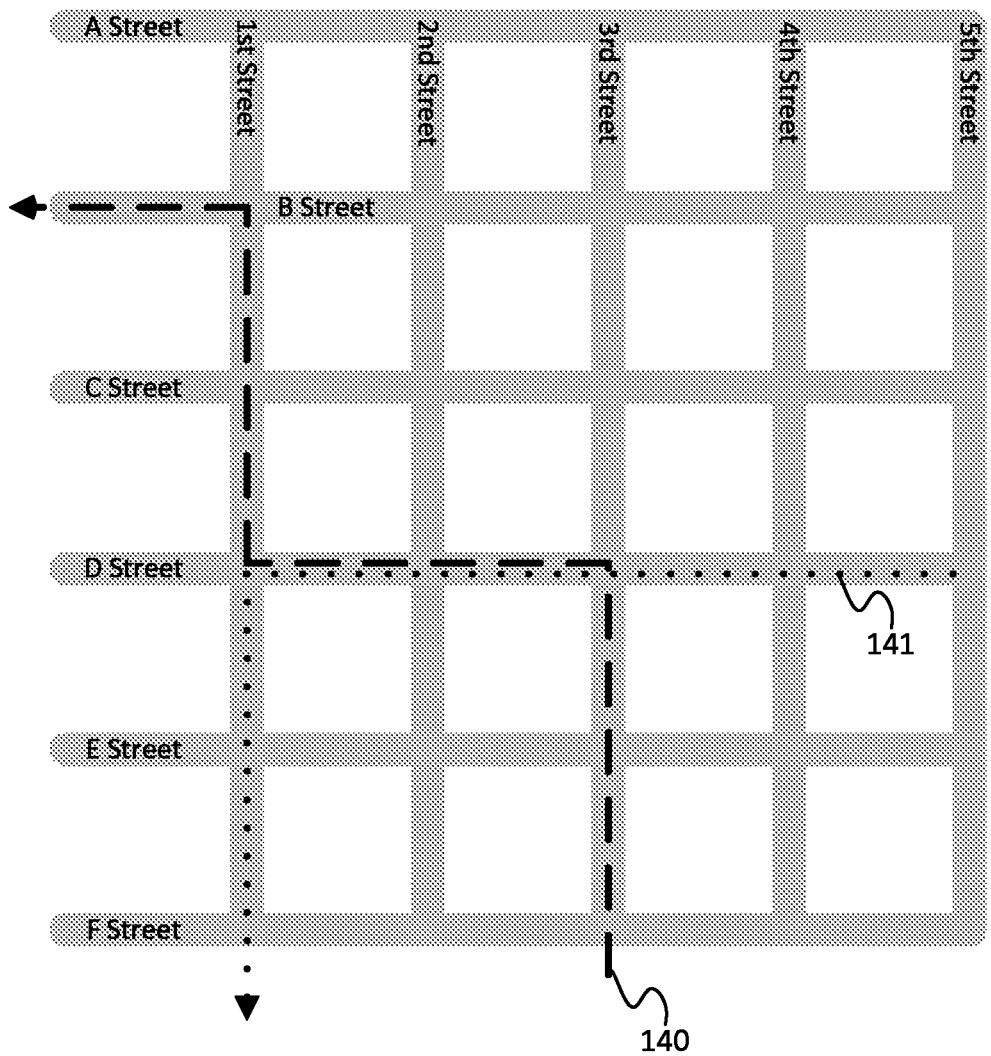
FIG. 2 illustrates an exemplary geographic region for predictive natural guidance.

FIG. 2 illustrates an example of geographic regions for predictive natural guidance and a currently moving landmark. FIG. 2 illustrates a geographical region of 25 city blocks made up of a grid of five north-south streets and six east-west streets. A route 141 is defined through the geographical region along D Street and $1^{st}$ Street. The route 141 (dotted line) may have been requested by mobile device 122. The route turn-by-turn directions may include: (1) continue west on D street, and (2) turn left on $1^{st}$ Street. A bus schedule defines path 140 (dashed line). The server 125 stores and/or receives the bus schedule. The bus schedules defines times that the bus is expected to travel on $3^{rd}$ Street, turn left on D Street, turn right on 1st Street, and turn left on B street.

The server 125 correlates the bus path 140 and the route 141. The server 125 may receive real time location data for the mobile device 122 traveling the route and the bus traveling the path. Depending on when and where the bus path 140 and the route 141 overlap, the server 125 generates assurance messages to be transmitted to the mobile device 122. If the bus is just ahead of the mobile device 122 at the intersection of $3^{rd}$ Street and D Street, the server 125 may generate and transmit an assurance message that includes "follow the 22 bus that just turned ahead." If the bus is ahead of the mobile device 122 at the intersection of $2^{nd}$ Street and D Street, the server may generate and transmit an assurance message that includes "stop following the 22 bus" and/or "at the next block and turn right." The correlation relies on the monitored location of the bus, but may instead use expected location based on the schedule. An indication of possibility may be provided with the assurance message, such as "follow the 22 bus (if on schedule or if present) that turned ahead)."

Figure 3:
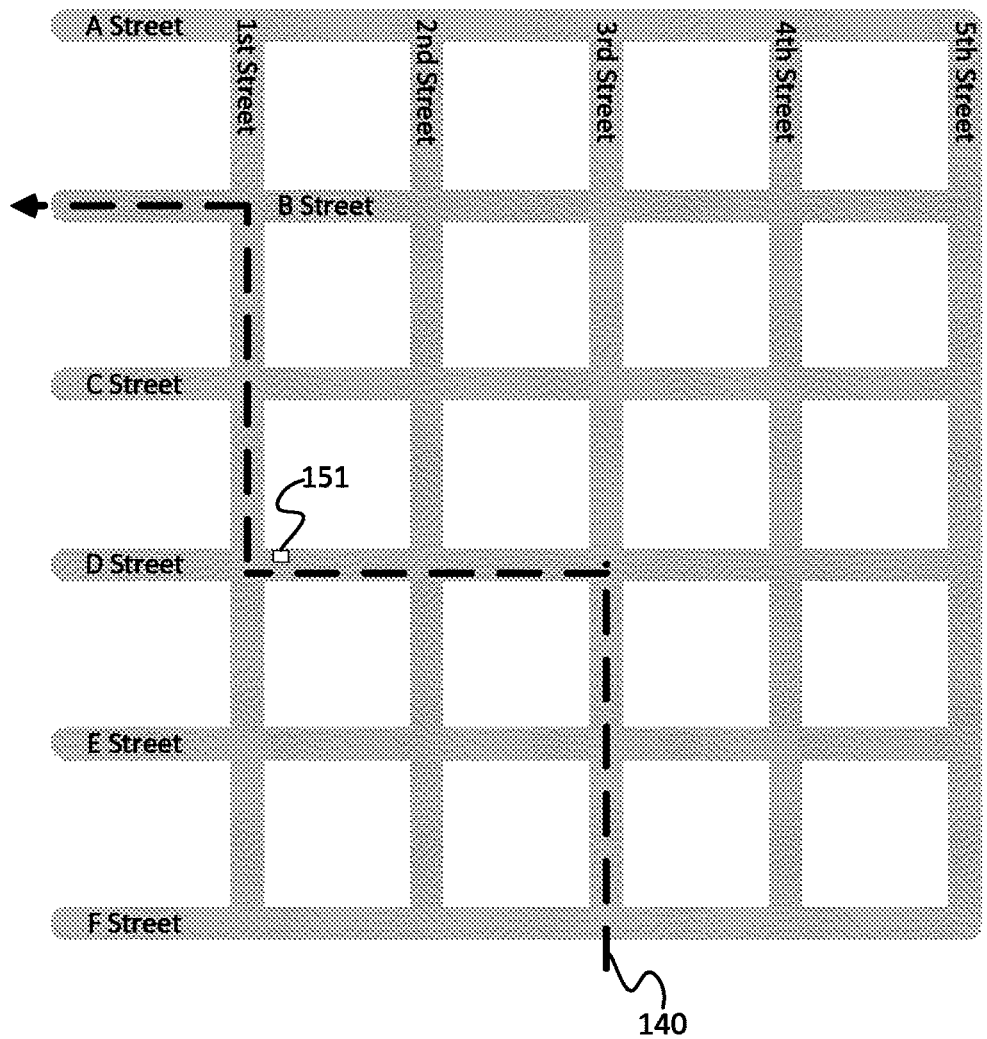
FIG. 3 illustrates another exemplary geographic region for predictive natural guidance.

FIG. 3 illustrates an example of geographic regions for predictive natural guidance and a landmark 151. The landmark 151 is currently stationary but is movable. Examples of the landmark 151 include a bus, a service or construction vehicle, or a food truck. At the time shown the landmark 151 is stationary at the intersection of $1^{st}$ Street and D Street. A route 141 is defined through the geographical region along 3rd Street, D Street, and $1^{st}$ Street. The route 141 may have been requested by mobile device 122. The route turn-by-turn directions may include: (1) continue north on 3rd Street, (2) turn left on D Street, and (3) turn right on $1^{st}$ Street. The route 141 passes in the vicinity of the landmark 151.

The server 125 correlates the expected location of the landmark 151 and the route 141. The server 125 receives expected or real time location data for the mobile device 122 traveling or being at part of the route 141. The server 125 generates assurance messages to be transmitted to the mobile device 122. An example assurance message in this scenario may include "turn right ahead of the 22 bus onto $1^{st}$ Street" or "wait behind the stopped 22 bus to turn right on $1^{st}$ Street." Alternatively, when the mobile device 122 approaches the intersection of $3^{rd}$ Street and D Street, the server 125 may generate and transmit a message that states "there is a bus slowing traffic on D Street—continue ahead to C Street or B Street and turn left."

The route 141 may be determined according to data in the database 123, which may be referred to as a geographic database. The geographic database 123 includes information about one or more geographic regions. Located in the geographic region are physical geographic features, such as roads, points of interest (including businesses, municipal facilities, etc.), lakes, rivers, railroads, municipalities, etc. A road network includes, among other things, roads and intersections located in the geographic region. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segments may include sidewalks and crosswalks for travel by pedestrians.

The road segment data includes a segment ID by which the data record can be identified in the geographic database 123. Each road segment data record has associated with it information (such as "attributes", "fields", etc.) that describes features of the represented road segment. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data and the schedule data for the landmark may be fused together seamlessly such that routing algorithms make no distinction between the types of landmarks. Alternatively, the schedule data may be included in a separate database, for example, internal to the server 125 and/or the mobile device 122, or at an external location.

Figure 4:
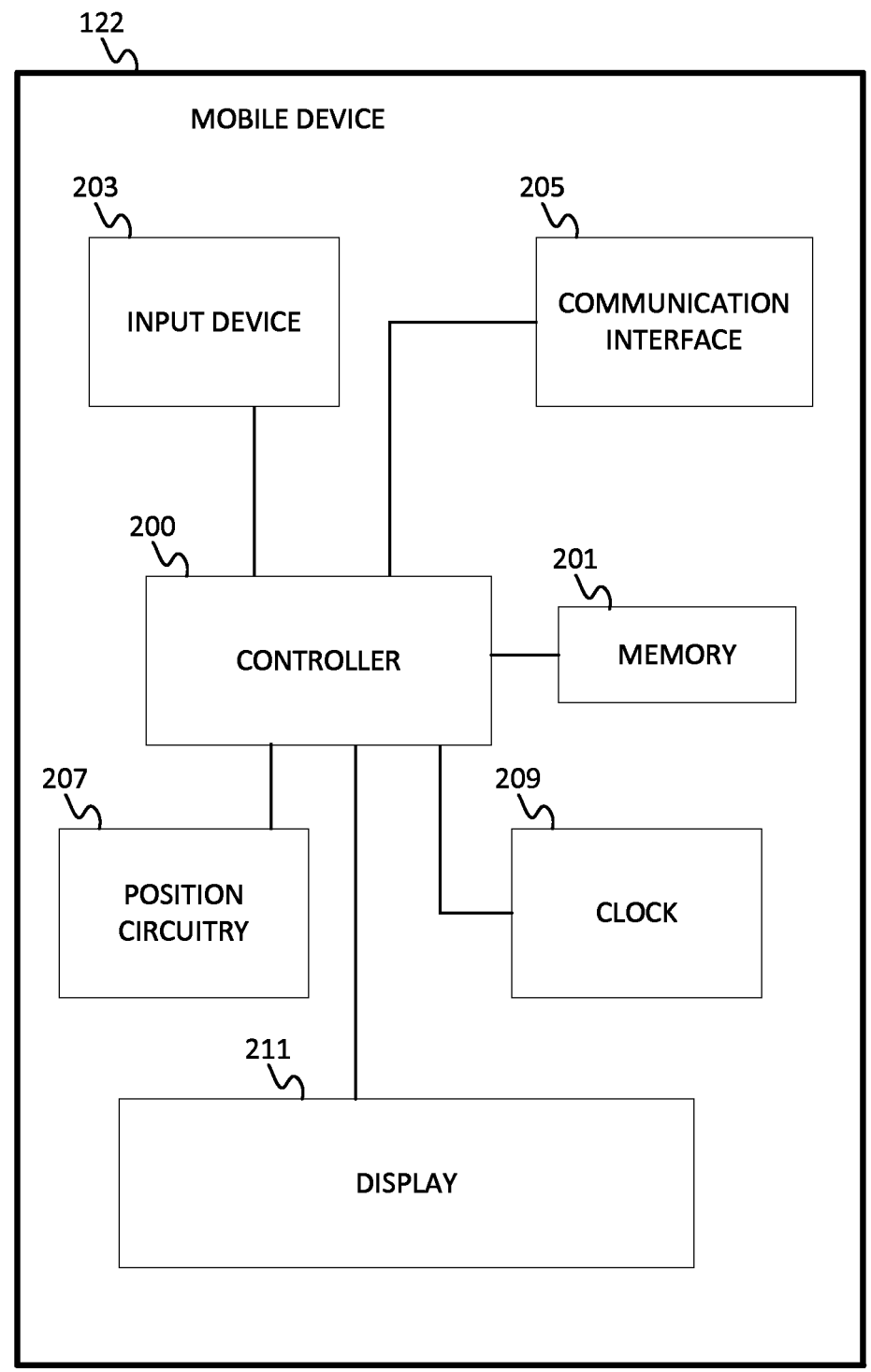
FIG. 4 illustrates an exemplary server of the mobile device of FIG. 1.

FIG. 4 illustrates an exemplary mobile device 122 of the navigation system of FIG. 2. The mobile device 122 may be referred to as a navigation device. The mobile device 122 includes a controller 200, a memory 201, an input device 203, a communication interface 205, position circuitry 207, a clock 209, and a display 211. Additional, different, or fewer components may be provided. In the endpoint-based embodiments, the mobile device 122 performs a majority of the processing for predictive natural guidance.

The memory 201 stores the location data for the mobile landmark. The location data may include identity data for the mobile landmark and pairs of time values and location values. The time value indicates a day and time that the mobile landmark is expected to be at a location described by the location value. The location value may include latitude/longitude values, an address, or may be referenced by the coordinates of the geographic database. The time values may describe a range of times. The location values may describe a range of locations.

The controller 200, which may be referred to as a processor, is configured to access the memory 201 for the schedule data, including one or more of the identity data, the time values, and the location values. The controller 200 also calculates a route according to the route calculation guidelines above. Alternatively, the controller 200 may receive a predetermined route from the server 125. The controller 200 compares the route to the expected locations of the mobile landmark. Based on the comparison, the controller 200 generates a navigation message that references the mobile landmark with respect to the route.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The controller 200 or the position circuitry calculates the origin location of the route of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device receives the input of the destination location for the calculation of the route. The input device 203 and the display 211 may be combined as a touch screen, which may be capacitive or resistive. The display 211 may be a liquid crystal display (LCD) panel, light emitting diode (LED) screen, thin film transistor screen, or another type of display. The display 211 is configured to present the navigation message or a graphic representative of the navigation message to a user. Alternatively, the navigation message may be played as audio.

The clock 209 may be incorporated into the controller 200 or software executed by the controller 200. The clock 209 outputs the current time, which is used to predict future locations of the mobile device 122.

The controller 200 may trigger generation of the navigation messages when a current location of the mobile device 122 is within a threshold distance from the landmark. Example thresholds include 10 meters, 100 meters, 200 meters or any value. The threshold may be configurable based on an input received at the input device 203. The controller 200 calculates a distance from the mobile device 122 to the landmark and triggers the generation of the navigation message when the distance is less than the threshold or passes the threshold.

Figure 5:
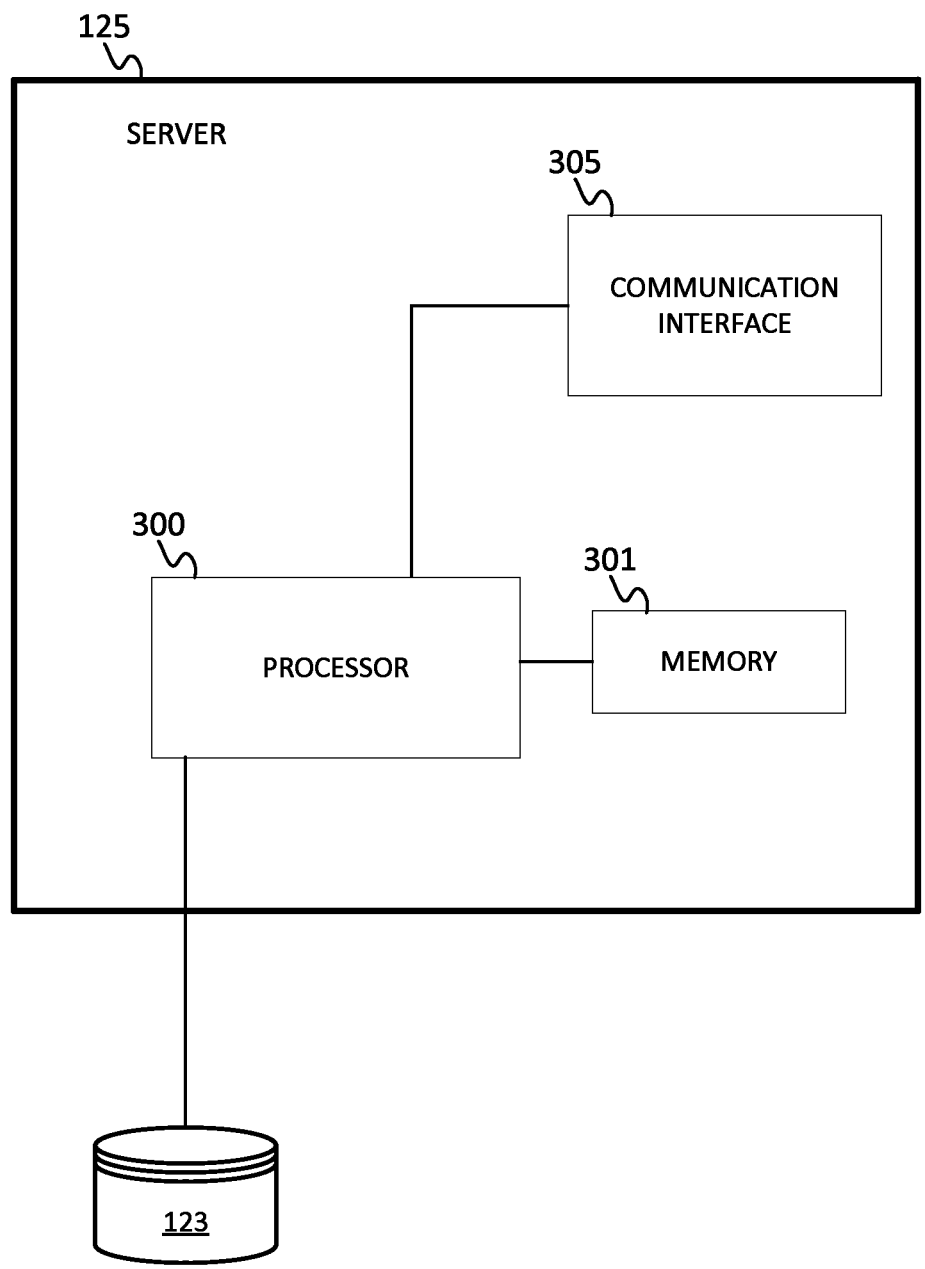
FIG. 5 illustrates an exemplary server of the navigation system of FIG. 1.

FIG. 5 illustrates an exemplary server 125 of the navigation system of FIG. 2. The server 125 includes a processor 300, a communication interface 305, and a memory 301. Additional, different, or fewer components may be included.

The server 125 may be coupled to a database 123 such as a geographic database as discussed above.

FIG. 6 illustrates schedule data of the navigation system of FIG. 1. The schedule data may be stored by database 123. The schedule data may be accessed via a lookup table 601. The lookup table 601 may be queried based on one or more of geographic position, landmark, date and time, or address. The geographic position may be stored as two-dimensional or three-dimensional values. The geographic position may be longitude and latitude values or in a reference system specific to the geographic database and/or the navigation system 120. In addition to the geographic position, or in the alternative, the lookup table 601 may include an address or estimated address of the landmark. The estimated address may be the closest intersection of streets or a node.

The landmark value may identify the mobile landmark (e.g., Bus 24 or Food Truck A). The time value may describe a time of day, a day, or both. The time value may indicate that the landmark is expected to be at that location daily by a flag (e.g., "d"). The time value may indicate a range of time (e.g., "11:30-14:00"). The time value may indicate days by a numerical value between 1 and 366 (e.g., 232) to signify which day of the year, or specific days of the week (e.g., "MWF").

The lookup table 601 also includes a field for the expected relationship of the landmark to the route. Examples of the expected relationship include cardinal directions (e.g., to the north, south side), an expected action of the landmark (e.g., turning right, coming to a stop, stationary), or a general direction (e.g., on the right, in the sky).

Additional, different, less information may be included in the lookup table 601. For example, the current location of the object as reported by or to a tracking system may be input into the schedule as a separate category or to replace the geographic position information.

The controller 300 may access the lookup table 601 from the database 123. Alternatively, all or a portion of the lookup table 601 may be transferred to the memory 301. The controller 300 is configured to receive the current location of the mobile device 122 via the communication interface 305. The controller 300 calculates a route based on the current location of the mobile device 122 and compares the route to the geographic locations in the lookup table 601.

For example, the controller 300 may generate a series of times and locations for the route of the mobile device 122. The number of entries in the series may be based on the distance and/or expected speed. The controller 300 determines whether any of the entries in the series coincide with the schedule of the mobile landmark. The controller 300 may calculate a distance from the route an expected path of the landmark.

Figure 7:
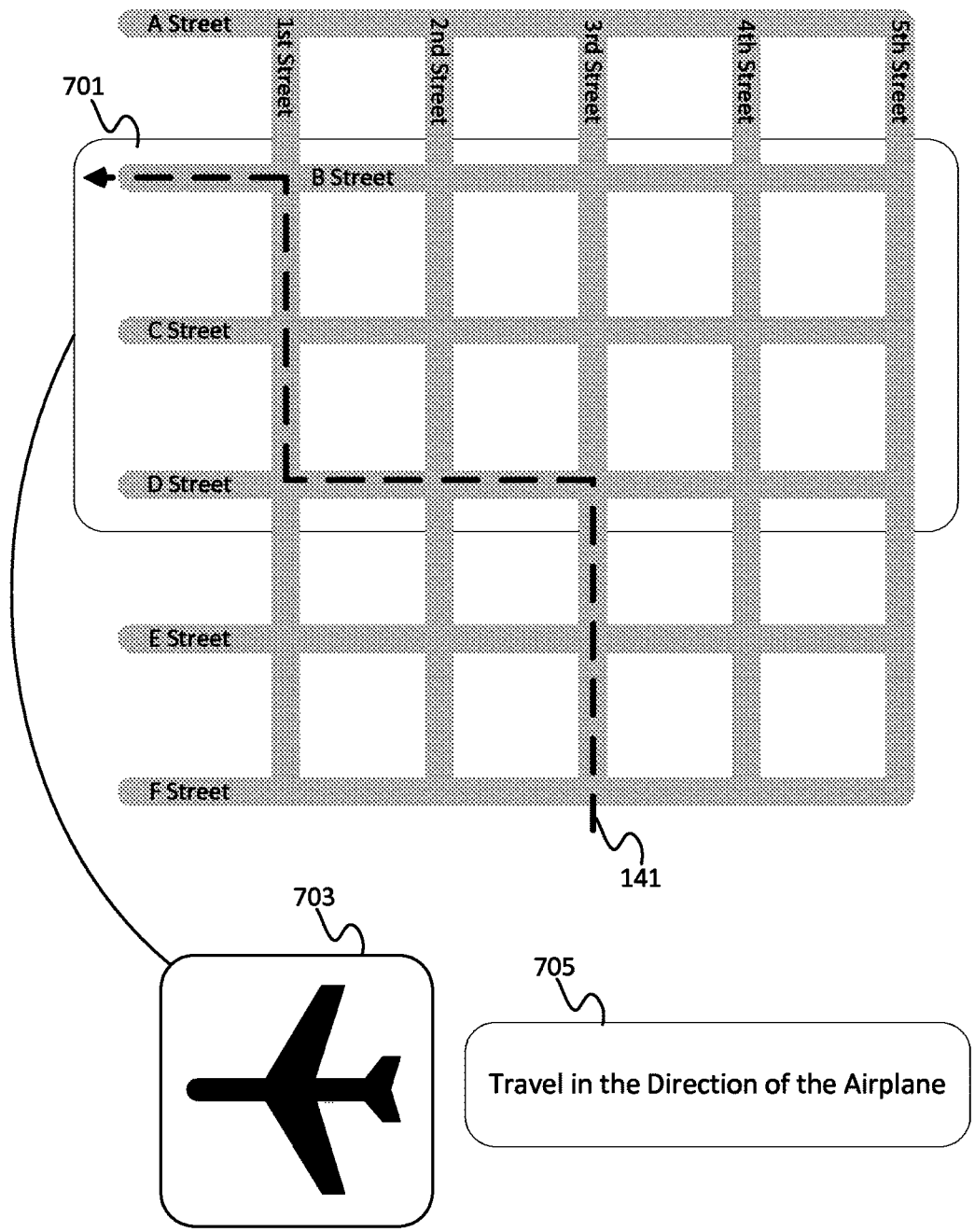
FIG. 7 illustrates another exemplary geographic region for predictive natural guidance.

FIG. 7 illustrates another example including a route 140. The controller 300 is configured to generate a geographical range 701. The geographical range 701 corresponds to an area from which a particular landmark is visible. The geographic range 701 may be defined as a distance around the landmark in the case of close landmarks such as a bus. The geographic range 701 may be defined in terms of blocks or miles in the case of far away landmarks such as the moon or an airplane. In FIG. 7, an airplane 703 is visible from any location within the geographic range 701. The controller may be configured to augment the route 140 at any locations within the geographic range 701 with a reference 705 to the airplane 703. Example references include "travel in the direction of the airplane above" or "follow the plane." The mobile device 122 may display the message along with a graphic of an airplane.

Figure 8:
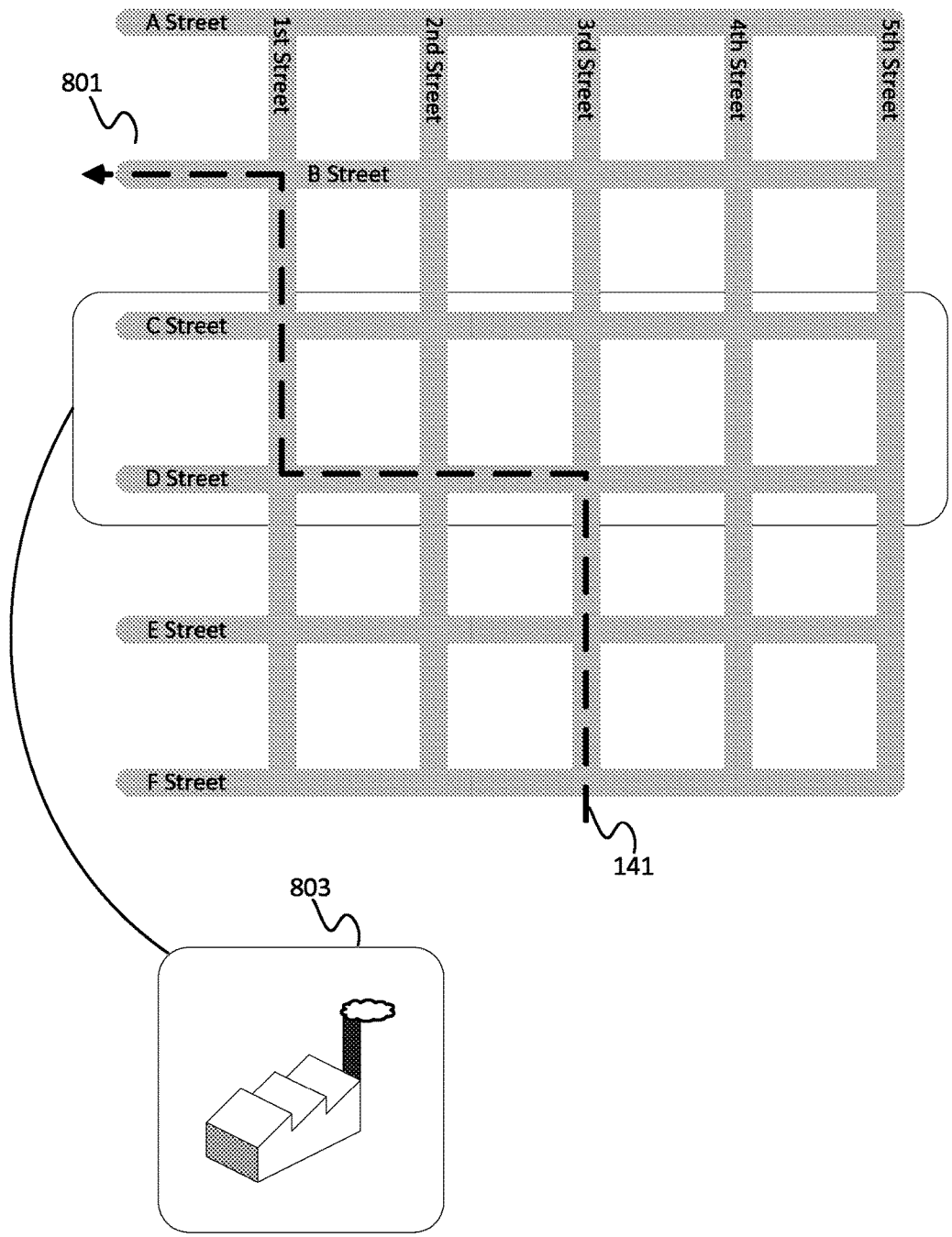
FIG. 8 illustrates another exemplary geographic region for predictive natural guidance.

FIG. 8 illustrates another example of a geographic range 801. The geographic range 801 is the area from which the smoke from factory 803 is visible. Geographic range 801 is smaller than geographic range 701 because the factory 803 is closer to the viewer and mobile device 122 than the airplane 703. The size of the geographic range may be inversely proportional to the distance from the mobile device 122 to the landmark. The wind speed and/or direction may be used to set the geographic range. The mobile device 122 may display the message along with a graphic of a factory.

Figure 9:
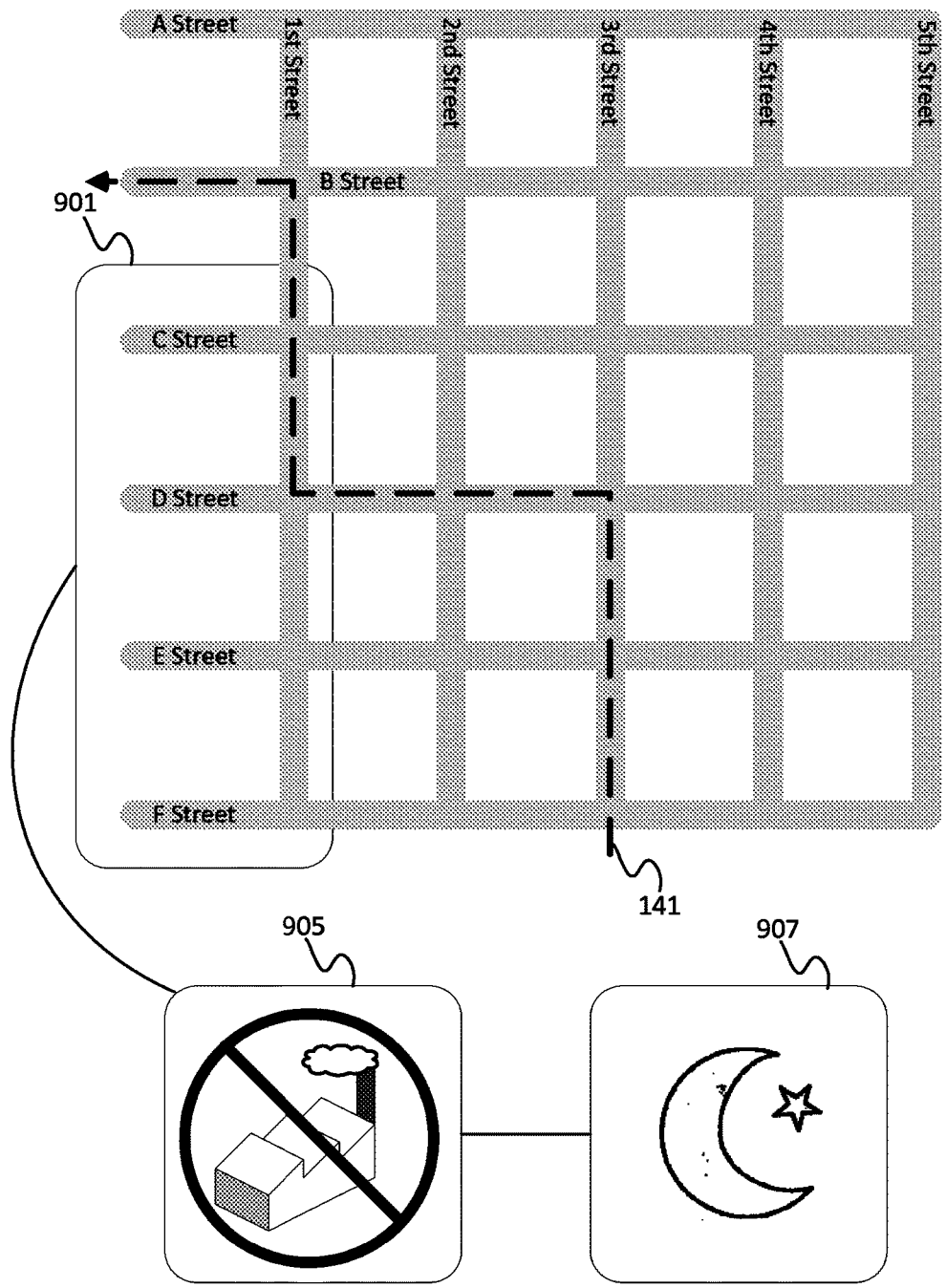
FIG. 9 illustrates another exemplary geographic region for predictive natural guidance.

FIG. 9 illustrates another example of a geographic range 901. The geographic range 901 corresponds to two landmarks. One of the landmarks is in the correct direction to follow the route 141. The other landmark is not in the correct direction to follow the route. For example, for the mobile device 122 traveling on $1^{st}$ Street as part of the route 141, the moon 907 is visible to the north, which is the correct direction of travel. The factory 905 is visible to the south, which is not the correct direction of travel. The controller 300 may be configured to generate and transmit an assurance message that includes "travel in the direction of the moon" and "if you can see factory smoke, turn around." The mobile device 122 may display the message along with a graphic of the moon and a graphic of a factory that indicates the wrong direction.

The controller 300 may be configured to compare the mobile device route and the landmark route using vectors. For example, a landmark vector is defined that references the expected position and direction of the landmark at different times, and a mobile device vector includes the expected position and direction of the mobile device 122 as it travels along the route. A comparison of the two vectors predicts the relationship between the mobile device 122 and the landmark.

The controller 300 may be configured to estimate the expected distances between the mobile device 122 and the landmark by comparing the landmark vector and the mobile device vector. The controller 300 may be configured to estimate whether the mobile device 122 and the landmark are expected to travel in the same direction or nearly the same direction by computing an angle between the landmark vector and the mobile device vector. The angle may be the arccosine of the dot product of the landmark vector and the mobile device vector. When the angle is less than a threshold (e.g., 10 degrees, 5 degrees), the mobile device 122 and the landmark are considered to be traveling in a substantially similar direction, and the assurance message includes terms such as "follow."

The controller 300 may also identify when the mobile device 122 and the landmark are near one another, but traveling in opposite directions. The controller 300 may be configured to block the generate navigation messages when the mobile device 122 and the landmark are within the threshold distance but traveling in different directions. The controller may determine that the mobile device 122 and the landmark are traveling in different direction with the angle between the landmark vector and the mobile device vector is greater than a threshold (e.g., 10 degrees, 40 degrees).

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 10:
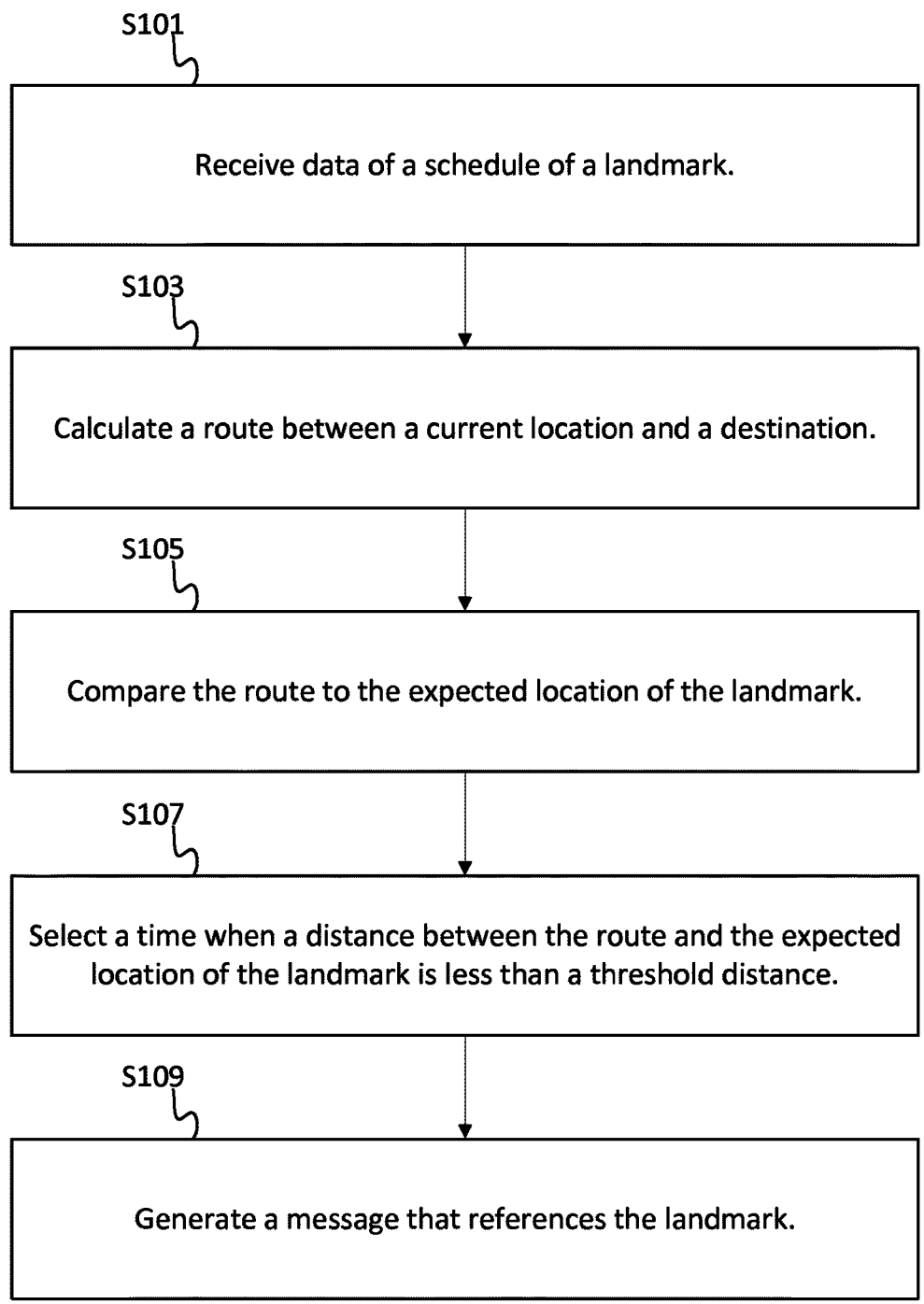
FIG. 10 illustrates an example flowchart for predictive natural guidance.

FIG. 10 illustrates an example flowchart for predictive natural guidance. The acts of the flowchart may be performed by any combination of the server 125 and the mobile device 122, and the term controller may refer to the processor of either of the devices. Additional, different, or fewer acts may be provided.

At act S101, the controller location data for a mobile landmark. The location data may be a schedule that is predefined (e.g., bus schedule) or estimated (e.g., food truck is present at meal times). The location data may be detected in real time (e.g., taxis and police cars equipped with positioning devices). The schedule describes expected locations of the mobile landmark.

At act S103, the controller calculates a route between a current location and a destination. The route calculation selects a best route according to routing algorithm that considers one or more of distance, traffic patterns, and speed limits. The current location may be received in the case of server-based embodiments or generated in the case of endpoint-based embodiments.

At act S105, the controller compares the route to the location of the active landmark from the location information of the active landmark. The comparison may be repeated for multiple times along the route. The comparison may be repeated every time interval (e.g., 1 second, 10 seconds) or every distance interval (e.g., 10 meters, 1 block). The comparison may include two components. The first components, position, may be compared by calculating a distance between the expected location of the active landmark and the location of the mobile device. The second component, direction, may be compared by calculating a dot product between a vector describe the path of mobile device and a vector describing the path of the active landmark. If the active landmark is currently or always stationary, then the direction component may not be used. At act S107, the controller selects a time from the plurality of times where a distance between the route and the location, such as the expected location, of the active landmark is less than a threshold distance.

At act S109, the controller generates a message that references the mobile landmark. In server-based embodiments, the message may be transmitted from the server 125 to the mobile device 122. In endpoint-based embodiments, the mobile device 122 generates the message. The mobile device 122 may display the message along with turn-by-turn directions for the route or in place of the turn-by-turn directions for the route.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    identifying a geographic location for a mobile landmark;
    receiving a current location of a mobile device, the current location determined by position circuitry;
    calculating, using a processor, a route from the current location to a destination location from data received from a geographic database, wherein the mobile landmark does not follow the route;
    determining, using the processor, a correlation between the route and the geographic location for the mobile landmark; and
    generating an assurance message based on the correlation between the route and the geographic location for the mobile landmark;
    wherein the assurance message includes a graphic indicative of the mobile landmark.

2. The method of claim 1, wherein the graphic indicative of the mobile landmark depicts a celestial body.

3. The method of claim 1, wherein the graphic indicative of the mobile landmark depicts an airplane.

4. The method of claim 1, wherein the graphic indicative of the mobile landmark indicates a wrong direction.

5. The method of claim 1, further comprising:
    presenting the route and the assurance message on the mobile device.

6. The method of claim 1, further comprising:
    receiving a schedule for the mobile landmark; and
    defining a landmark vector from the schedule, wherein the landmark vector references an expected position for the geographic location of the mobile landmark and direction of the mobile landmark according to the schedule.

7. The method of claim 6, further comprising:
    defining a mobile device vector based on the route and a current time, wherein determining the correlation comprises:
    comparing the landmark vector and the mobile device vector.

8. The method of claim 7, further comprising:
    calculating an angle between the landmark vector and the mobile device vector.

9. The method of claim 1, further comprising:
    removing a portion of the route; and
    incorporating the assurance message into the route.

10. A method comprising:
    identifying a geographic location for a mobile landmark;
    receiving a current location of a mobile device, the current location determined by position circuitry;
    generating, using a processor, a route based on the current location and a destination location based on a geographic database, wherein the mobile landmark does not follow the route;
    determining, using the processor, a correlation between the route and the geographic location for the mobile landmark;
    generating an assurance message based on the correlation between the route and the geographic location for the mobile landmark;
    wherein the assurance message includes a graphic indicative of the mobile landmark;
    augmenting the route to include the assurance message; and
    sending the route to the mobile device.

11. An apparatus comprising:
    at least one processor; and
    at least one memory including computer program code for one or more programs, the at least one memory and the computer program code configured to, with the at least one processor, cause the apparatus to perform at least the following:
    identifying a geographic location for a landmark;
    receiving a current location of a mobile device, the current location determined by position circuitry;
    generating a route from the current location to a destination location based on data from a geographic database;
    determining, using a processor, a correlation between the route and the geographic location for the landmark;
    receiving a schedule for the landmark;
    defining a landmark vector from the schedule, wherein the landmark vector references an expected position and direction of the landmark according to the schedule; and
    generating an assurance message based on the correlation between the route and the geographic location for the landmark;

wherein the assurance message includes a graphic indicative of the landmark.

12. The apparatus of claim 11, wherein the landmark does not follow the route.

13. The apparatus of claim 11, wherein the graphic indicative of the landmark depicts a celestial body or an airplane.

14. The apparatus of claim 11, wherein the graphic indicative of the landmark indicates a wrong direction.

15. The apparatus of claim 11, the at least one memory and the computer program code configured to, with the at least one processor, cause the apparatus to perform at least the following:
defining a mobile device vector based on the route, wherein determining the correlation comprises:
comparing the landmark vector and the mobile device vector.

16. The apparatus of claim 15, the at least one memory and the computer program code configured to, with the at least one processor, cause the apparatus to perform at least the following:
calculating an angle between the landmark vector and the mobile device vector.

17. The apparatus of claim 16, wherein the assurance message is generated in response to the angle being in a threshold range of angles.

18. A non-transitory computer readable medium including instructions that when executed are operable to:
receive data of an expected geographic location of a mobile landmark;
calculate a route between a current location of a mobile device and a destination, wherein the current location of the mobile device is detected by position circuitry;
compare the route to the expected location of the mobile landmark; and
generate a message including turn-by-turn directions that references the mobile landmark according to the expected location of the mobile landmark.

19. The non-transitory computer readable medium of claim 18, wherein the message graphically references the mobile landmark, and the message is to be displayed to describe the route.

20. The non-transitory computer readable medium of claim 18, wherein the message includes audio.

21. A method comprising:
identifying a geographic location for a landmark;
receiving a current location of a mobile device, the current location determined by position circuitry;
generating, using a processor, a route from the current location to a destination location, wherein the landmark does not follow the route;
determining, using the processor, a correlation between the route and the geographic location for the landmark; and
generating an assurance message based on the correlation between the route and the geographic location for the landmark;
wherein the assurance message includes a graphic indicative of the landmark,
wherein the graphic indicative of the landmark depicts a celestial body.

* * * * *